UNITED STATES PATENT OFFICE.

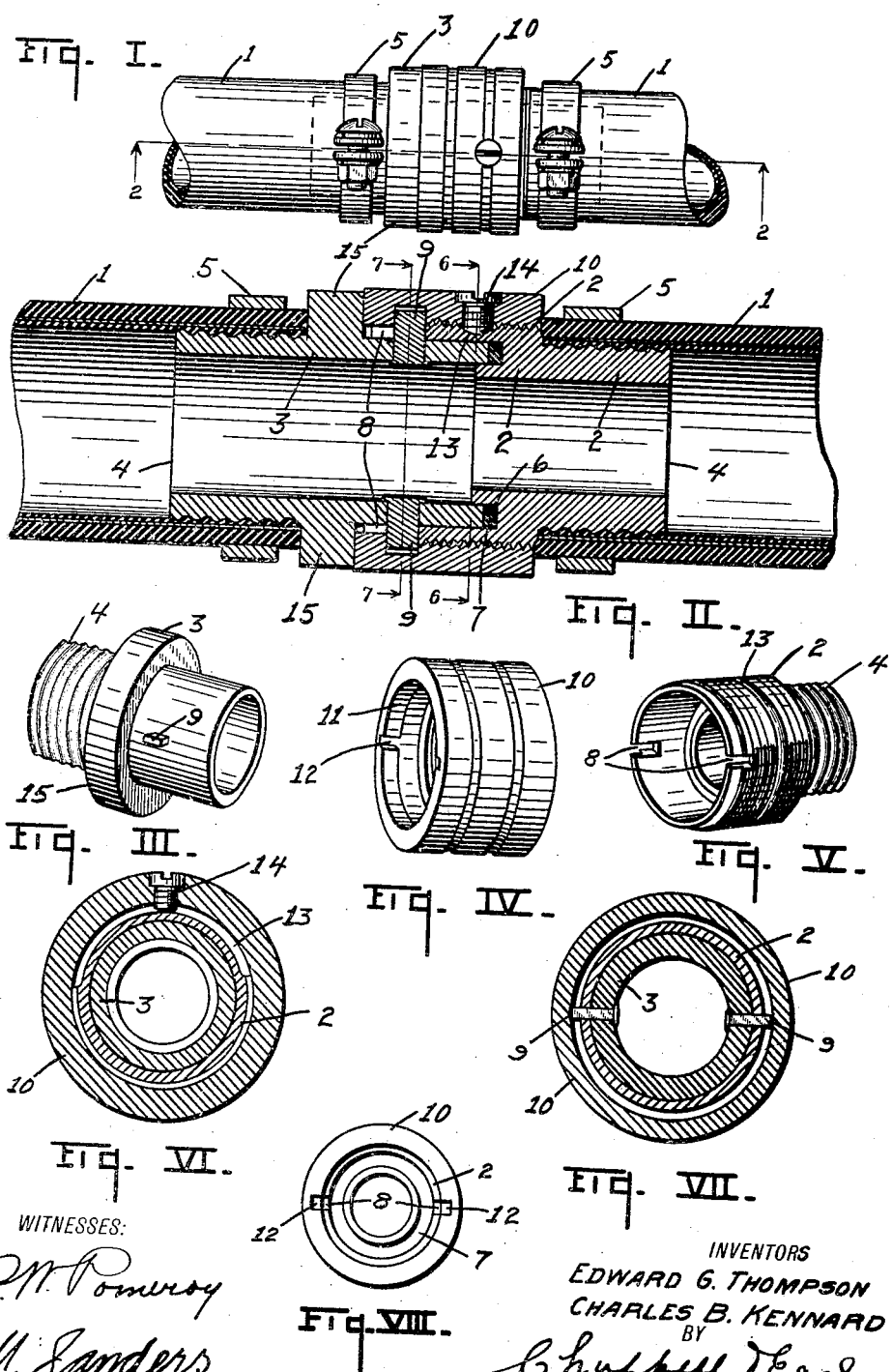

EDWARD G. THOMPSON AND CHARLES B. KENNARD, OF BATTLE CREEK, MICHIGAN; SAID KENNARD ASSIGNOR TO SAID THOMPSON.

PIPE-COUPLING.

1,238,218.          Specification of Letters Patent.     Patented Aug. 28, 1917.

Application filed March 5, 1915. Serial No. 12,316.

*To all whom it may concern:*

Be it known that we, EDWARD G. THOMPSON and CHARLES B. KENNARD, citizens of the United States, residing at Battle Creek, Michigan, have invented certain new and useful Improvements in Pipe-Couplings, of which the following is a specification.

This invention relates to improvements in pipe couplings.

The main objects of this invention are:

First, to provide an improved pipe coupling which is very secure and provides a tight joint and at the same time one which provides for easy and rapid manipulation in joining or uncoupling the parts.

Second, to provide an improved pipe coupling having these advantages which is comparatively economical in structure and very durable.

Further objects, and objects relating to structural details, will definitely appear from the detailed description to follow.

We accomplish the objects of our invention by the devices and means described in the following specification. The invention is clearly defined and pointed out in the claims.

A structure which is a preferred embodiment of our invention is clearly illustrated in the accompanying drawing, forming a part of this specification, in which:

Figure I is a side elevation of a coupling embodying the features of our invention, the coupling being shown applied to sections of flexible hose.

Fig. II is an enlarged detail longitudinal section on a line corresponding to line 2—2 of Fig. I.

Fig. III is a perspective view of the male coupling member.

Fig. IV is a perspective view of the clamping member.

Fig. V is a perspective view of the female coupling member.

Fig. VI is a cross section on a line corresponding to line 6—6 of Fig. II.

Fig. VII is a cross section on a line corresponding to line 7—7 of Fig. II.

Fig. VIII is an end view of the female member with the clamping member thereon.

In the drawings similar reference characters refer to similar parts throughout the several views, and the sectional views are taken looking in the direction of the little arrows at the ends of the section lines.

Referring to the drawing, the pipe sections 1 shown are rubber hose. We provide a female coupling member 2 and a male coupling member 3 having nipples 4 to which the pipe sections are secured by means of the clamps 5.

The female coupling member 2 is provided with an internal shoulder having an annular forwardly facing gasket groove or seat 6 therein for the gasket 7. The male member is adapted to fit the female member in front of its shoulder and project into the gasket seat and abut the gasket 7. The female member is provided with longitudinal slots 8 in its front end, while the male member is provided with radial lugs 9 engaging and projecting through these slots in the female member when the parts are assembled. The female member is threaded to receive the internally threaded clamping sleeve or member 10. This clamping member is provided with an internal rib-like flange 11 having notches or slots 12 therein through which the lugs 9 may be entered when the notches 12 are alined with the slots 8 of the female member, as shown in Fig. VIII.

With the lugs entered in these notches 12 the clamping member is turned to bring the lugs behind the ribs or flanges 11 which locks the parts together and owing to the threaded engagement of the clamping sleeve with the female member on which it is mounted clamps the male member against the gasket and secures the parts together.

The female member is provided with a peripheral segmental groove 13, while the clamping member is provided with a stop 14 projecting into this groove and coacting with the ends of the groove to limit the rotative movement of the clamping member.

The stop is so arranged that when it engages one end of the groove the notches 12 are brought into alinement with the notches 8.

The male member is preferably provided with an annular enlargement 15 with which the clamping member abuts when the parts are assembled, the enlargement being for convenience in handling the parts. This enlargement and the clamping member are preferably knurled in order to facilitate manipulation.

By this arrangement of parts they may be quickly joined or disconnected and the coupling is very secure. The coupling is of particular advantage on large hose couplings, such as fire hose, as the parts are quickly engaged and disengaged and the joint is, as stated, very secure.

As there is no relative rotative movement between the male and female members the wear on the gasket is minimized, the gasket being seated in the groove-like gasket seat is not likely to become lost or disarranged. The gasket is supported so that it cannot be squeezed out of its seat by the tightening of the members and it is not subject to wear by the action of the material passing through the pipe. Another advantage of the structure in use is that no wrenches are required even on large couplings such as are used on fire hose.

We have illustrated and described our improved coupling in detail in the form in which we have embodied the same. We have not attempted to illustrate or describe certain modifications which we contemplate, as we believe the disclosure made will enable those skilled in the art to which our invention relates to embody or adapt the same as may be deemed desirable to meet corresponding requirements. We desire, however, to be understood as claiming our improvements specifically in the form illustrated as well as broadly within the scope of the appended claims.

Having thus described our invention, what we claim as new and desire to secure by Letters Patent, is:

1. In a coupling, the combination of a female member having longitudinal slots in its front end, a male member disposed in said female member and provided with lugs engaging and projecting through said slots in said female member and resting upon the bottoms of said slots, a clamping member mounted for threaded adjustment on said female member and having internal longitudinal recesses extending to its outer end and registering with said slots in said female member when said clamping member is in one position and internal grooves opening into said recesses and adapted to receive and contact with the edges of said lugs, said female member being extended over and covering said grooves, said lugs when engaged with said recesses being adapted to ride on the end of said female member until brought into register with said slots thereof, and coacting stops on said female member and clamping member positioned so that the clamping member recesses register with the slots of the female member when the clamping member is in one stop engaging position.

2. In a coupling, the combination of a female member having longitudinal slots in its front end, an external stop groove, a male member disposed in said female member and provided with lugs engaging and projecting through said slots in said female member and resting upon the bottoms of said slots, a clamping member mounted for threaded adjustment on said female member and having internal longitudinal recesses extending to its outer end and registering with said slots in said female member when said clamping member is in one position and internal grooves opening into said recesses and adapted to receive said lugs, said female member being extended over and covering said grooves, said lugs when engaged with said recesses being adapted to ride on the end of said female member until brought into register with said slots thereof, and a stop on said clamping member coacting with said stop groove in said female member, said clamping member stop being positioned so that the clamping member recesses register with the slots of the female member when the clamping member stop is at one end of the stop groove.

3. In a coupling, the combination of a female member having longitudinal slots in its front end, and an internal shoulder provided with a forwardly facing gasket channel, a resilient gasket disposed in said channel, a male member disposed in said female member with its inner end projecting into said gasket channel and abutting the gasket therein, the inner wall of the channel projecting into and fitting into said male member, said male member being provided with lugs engaging and projecting through said slots in said female member and resting upon the bottoms of said slots, a clamping member mounted for threaded adjustment on said female member and having internal longitudinal recesses extending to its outer end and registering with said slots in said female member when said clamping member is in one position and internal grooves opening into said recesses and adapted to receive said lugs, said female members being extended over and covering said grooves, said lugs when engaged with said recesses being adapted to ride on the end of said female member until brought into register with said slots thereof, and coacting stops on said clamping member and female member positioned so that the clamping member recesses register with the slots of the female member when the clamping member is in one stop engaging position.

4. In a coupling, the combination of a female member having longitudinal slots in its front end, a male member disposed in said female member and provided with lugs engaging and projecting through said slots in said female member and resting upon the bottoms of said slots, a clamping member mounted for threaded adjustment on said female member and having an internal groove for receiving said lugs and spaced recesses extending from said groove to the end of said clamping member, the slots in said female member being spaced to register with the recesses in said clamping member in one position of the said members and the sides of said groove contacting with the edges of said lugs, and coöperating stop members on said female member and clamping member to limit the longitudinal movement of the clamping member on said female member.

In witness whereof, we have hereunto set our hands and seals in the presence of two witnesses.

EDWARD G. THOMPSON. [L. S.]
CHARLES B. KENNARD. [L. S.]

Witnesses:
LUELLA G. GREENFIELD,
ANNIE E. PARRY.

Copies of this patent may be obtained for five cents each, by addressing the "Commissioner of Patents, Washington, D. C."